Nov. 4, 1947.      M. SHOELD      2,430,145
TREATMENT OF HYDROGELS
Filed July 3, 1943      2 Sheets-Sheet 1
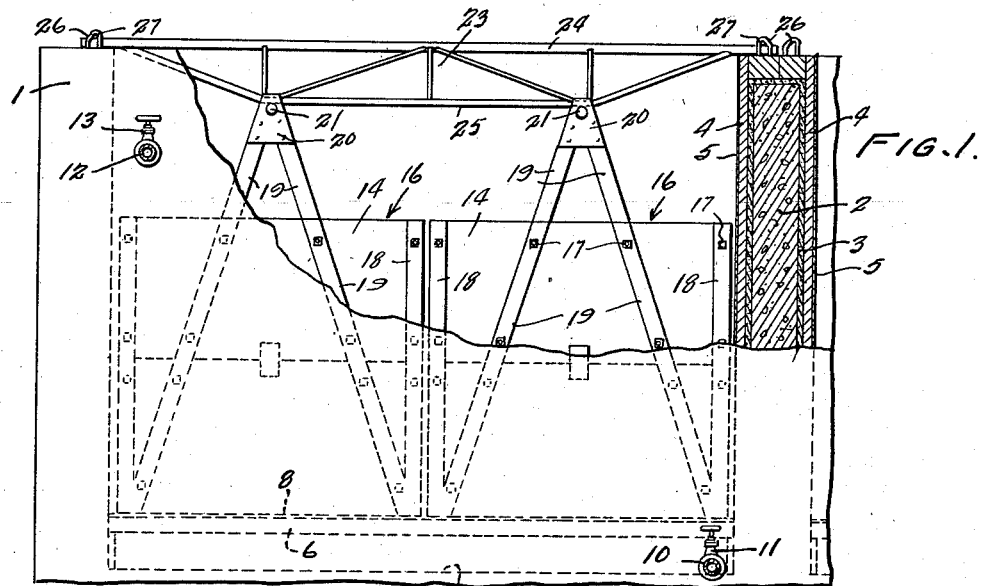
FIG.1.
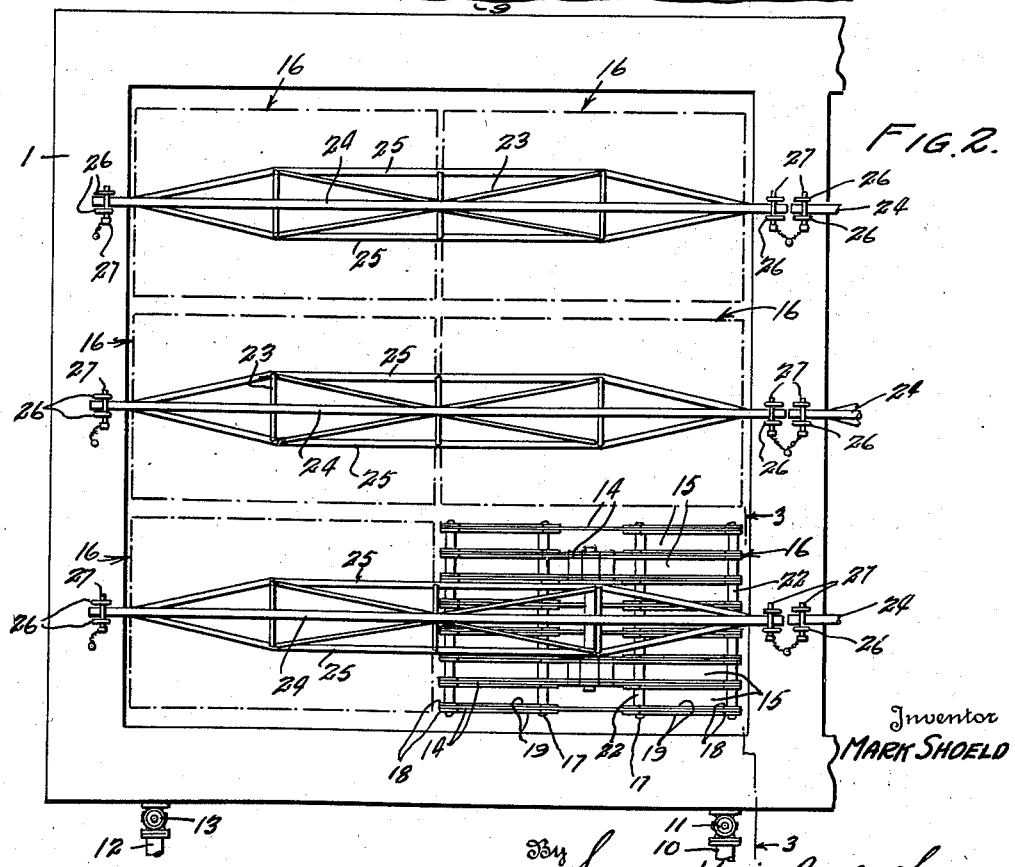
FIG.2.
Inventor
MARK SHOELD
By 
Attorneys Nov. 4, 1947.  M. SHOELD  2,430,145
TREATMENT OF HYDROGELS
Filed July 3, 1943  2 Sheets-Sheet 2
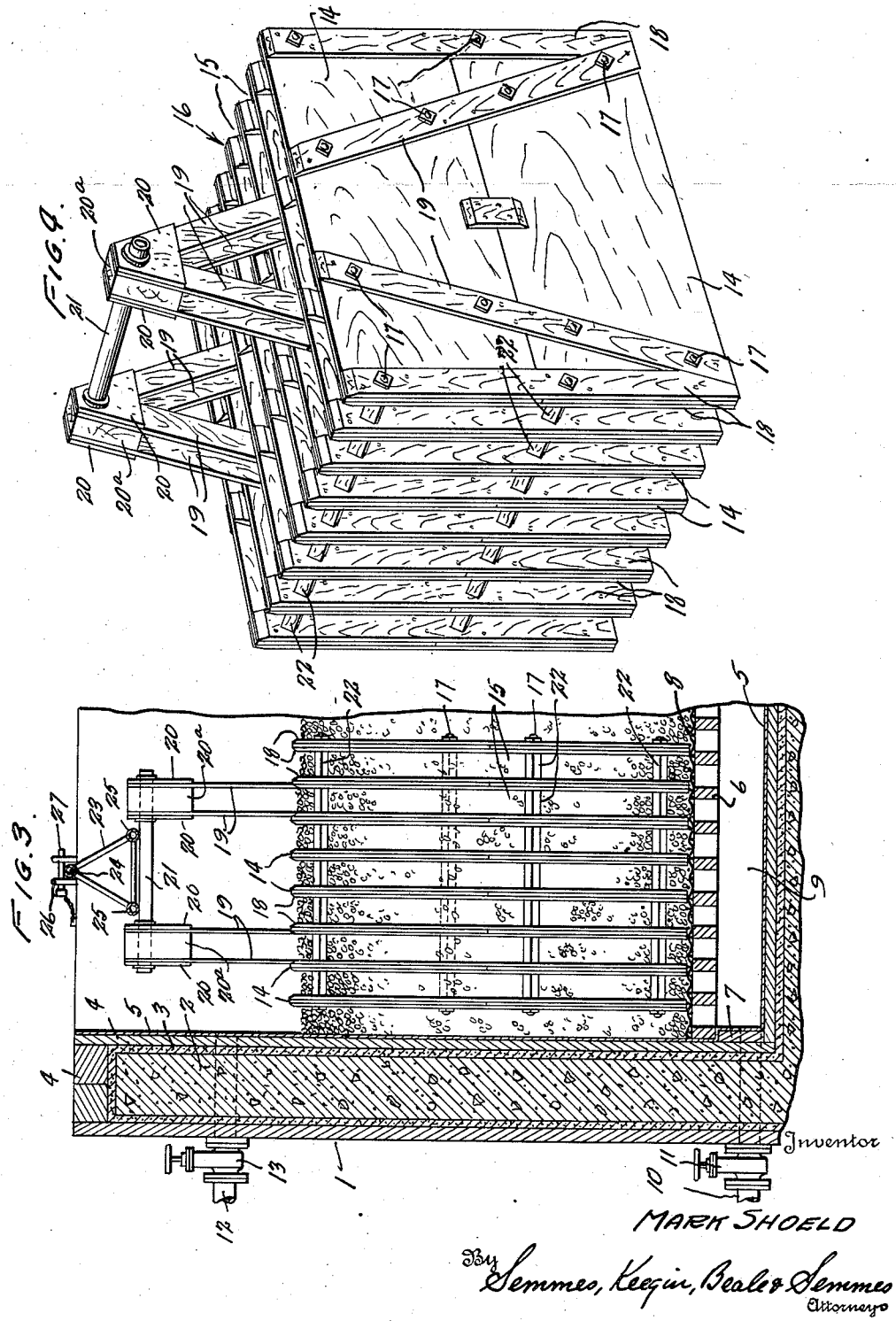
Inventor
MARK SHOELD
By Semmes, Keegin, Beale & Semmes
Attorneys Patented Nov. 4, 1947

2,430,145

UNITED STATES PATENT OFFICE 2,430,145

TREATMENT OF HYDROGELS

Mark Shoeld, Baltimore, Md., assignor to The Davison Chemical Corporation, Baltimore, Md.

Application July 3, 1943, Serial No. 493,462

6 Claims. (Cl. 252—359)

This invention relates to improved methods of and means for treating a hydrogel and more particularly to the washing or purifying of gels such as those obtained in the production of silica gel.

An important part of the processes of preparing such gels is that comprising the steps employed in washing a hydrogel. According to one method of preparing, for instance, a silica hydrogel, silicate and acid solutions are mixed in such proportions and concentrations as to give a "sol." The sol is permitted to stand for a period during which its viscosity gradually increases until the whole body of the sol hardens and sets or coagulates into a mass known as the "hydrogel." After the hydrogel has stood for a certain prescribed period it is washed with water to remove excess free acid reagent and any soluble by-product. In preparing the gel from sodium silicate, for instance, the sodium salt of the acid reagent, and the excess free acid reagent are removed. If hydrochloric or sulphuric acids are used, sodium chloride or sodium sulphate respectively are formed and during washing are removed along with the corresponding acid. After the washing is completed, the hydrogel is dried or dehydrated in any suitable manner.

The control of the washing treatment is important in obtaining a product of proper density as well as a product that is permanently heat stable on repeated activation. Patent No. 1,900,859, dated March 7, 1933, describes methods of washing hydrogel whereby a gel product of any desired apparent density is obtained by controlling the temperature of the wash liquid. The final product may be a gel having wide or narrow pores or pores of an intermediate size depending upon at what temperature in the range of from about 90° F. to about 190° F. the wash liquid is maintained. A large proportion of the silica gel now sold for commercial purposes is gel which has been washed at 150° F. A certain proportion is gel which has been washed at 175° F.

It has heretofore been the practice to wash hydrogel by means of what is generally known as the tray method. In the latter method a hydrogel broken into lumps is placed in shallow trays provided with perforated bottoms. These trays are positioned horizontally on a rack and the loaded rack is placed in a washing tank. Water is circulated through the tank for a period of approximately thirty-six to forty-eight hours or until sodium sulphate from a sodium silicate-sulphuric acid reaction product is washed down to approximately 0.1% or less (based on a finished gel).

The tray method has been used because hydrogel is very weak structurally and there is a tendency for it to pack if placed in deep layers. The tray method is expensive in its operation and in maintenance and replacement of equipment.

Various attempts have been made to wash gels in bulk rather than in small batches as in the tray method. These attempts have been heretofore universally unsuccessful. Washing the gel in one deep bed or layer is impractical because packing of the gel takes place and this prevents even distribution of washing fluid due to variations in the resistance to the flow of the washing fluids. The only part of the gel that is sufficiently washed in a deep bed is the gel in the uppermost zone of such a bed or layer. The gel in the lower zones thereof is left in an entirely unsatisfactory state. The velocity of flow of the wash water through gel is generally required to be extremely slow as for instance about one gallon per minute per square foot, or a vertical velocity of about one and one-half inches per minute or 0.025 inches per second. At this velocity the water is far below the critical point of turbulent flow. Although the wash water is recirculated and the velocity of flow is increased, the washing of the gel is not improved sufficiently by these factors alone. Furthermore, with increased rate of flow a considerable proportion of gel is lost due to the reversion thereof to the sol state.

An object of this invention is to provide a method and apparatus for washing hydrogel.

Another object is to provide a method and apparatus for washing hydrogel in bulk while the same is supported by substantially vertical walls, detachable to facilitate removal of the hydrogel.

A further object of this invention is to provide a method and apparatus for washing silica gel and converting the same into a plural gel.

Other objects and advantages of this invention will appear more fully hereinafter.

To facilitate an understanding of the present invention, reference is made to the accompanying drawings in which:

Figure 1 is an elevational view partly in section of a tank for the treatment of the hydrogel.

Figure 2 is a plan view of the tank.

Figure 3 is a fragmentary sectional view taken on line 3—3 of Figure 2.

Figure 4 is a perspective view of a cluster of partitions.

In accordance with the present invention, a tank or container 1 of substantial depth is provided into which the hydrogel to be washed and treated is introduced. Tank 1 is constructed of concrete or other suitable material 2 which is provided with a mastic coating 3. The tanks are lined with wooden planks 4 which serve as supports for a final lead lining 5. In a plant, a series of the tanks may be formed integrally but since the construction of each tank is substantially identical, only one tank will be described. A false bottom in the form of a perforated plate 6 is supported upon a ledge 7 formed on the side walls of the tank adjacent the bottom thereof. A layer of burlap 8 or other suitable foraminous material is disposed over the perforated false bottom 6 to support the hydrogel thereon. The compartment 9 formed beneath the false bottom 6 has a conduit 10 communicating therewith which is controlled by a suitable valve 11. A conduit 12 communicates with the interior of the tank adjacent the upper end thereof and is provided with a valve 13 for controlling the flow of liquid therethrough.

One of the features of the present invention is the provision of a plurality of removable partitions 14 for dividing the interior of the tank into a plurality of small compartments 15. In accordance with the present invention, the partitions 14 are arranged in clusters 16. For purposes of illustration, each cluster as shown in the drawings consists of eight partitions secured together and removable as a unit. Also for purposes of illustration, the drawing illustrates a tank which contains six clusters. Obviously, however, the number of partitions in a cluster and the number of clusters arranged in a tank may be varied to fit the conditions at hand.

As illustrated in the drawing, each cluster 16 is composed of a number of parallel plates or partitions 14 secured together by bolts 17. The plates or partitions 14 may be formed of plywood or other thin material and are reinforced along their vertical edges by strips 18 and in addition are provided with inclined reinforcing strips 19 which extend from the lower outer edges upwardly and inwardly to the tops of the plates. The reinforcing strips serve to stiffen the partitions 14 and it will be noted that the bolts 17 pass through holes which are bored through the reinforcing strips 18 and 19. Certain of the reinforcing strips 19 extend upwardly beyond the tops of the partitions 14 and are connected together by cross members 20 and 20a through which extend lifting bars 21. With this construction, the lifting bars 21 may be engaged by the hook of a crane or hoist and the entire cluster 16 lifted bodily from the tank. In order to maintain the partitions of a given cluster in definite spaced relationship, spacing members 22 may be mounted on the bolts 17 and interposed between adjacent partitions.

When the tank 1 is to be used for the washing or treatment of hydrogel in accordance with the present invention, the clusters 16 are lowered into position in the tank as illustrated in Figure 2 of the drawings. In order to retain the clusters in the positions in which they are placed, means are provided for holding the partitions down against the bottom of the tank. As illustrated in the drawings, this means comprises built-up truss members 23 formed of an upper bar 24 and a pair of lower bars 25. The upper bar 24 is of sufficient length to bridge across the tops of the side walls of the tank and to fit between pairs of staple-like members 26 which are adapted to receive pins 27 after insertion of the bars 24 therebetween in order to hold the bars 24 down against the tops of the side walls of the tank.

The truss members 23 are of such a size that the lower bars 24 will engage the lifting bars 21 of the clusters and thereby securely maintain the clusters of partitions against the bottom of the tank.

When the clusters of partitions 14 are in position as shown in the drawings, they extend from the false bottom 6 up to a position beneath the level of the hydrogel to be washed and preferably below the conduit 12. The partitions 14 form side walls of the compartments 15 and are spaced a relatively short distance apart so that when particles of hydrogel fill the compartments to a depth substantially greater than the distance between the partitions, no packing of the hydrogel takes place in the compartments. It appears that the walls formed by the partitions 14 reduce the effect of the weight of the column of hydrogel in the compartments 15 in the upper regions of the compartments on the hydrogel in the lower regions thereof. Practically the entire weight of the hydrogel is supported or absorbed by the side walls of the compartment and the very bottom of a compartment supports a weight corresponding to a layer of hydrogel of only a few inches in depth.

As is apparent from the drawings, the side walls of the compartments 15 formed by the partitions 14 and the walls of the tank 1 are preferably upright or vertical and the opposite walls are parallel to each other.

In operation, a hydrogel produced by reaction between a silicate solution and an acid, for instance, is introduced into the tank 1 after the clusters of partitions 14 have been positioned therein. It has been found advantageous to fill the tank 1 first with water up to a level about 2 or 3 feet above that of the tops of the partitions 14. A hydrogel which has been broken up, for instance, by passing it through a coarse screen or otherwise is then dumped into the compartments of the tank 1 provided between the partitions 14. This hydrogel is generally in the form of lumps and is a non-sticky, relatively fragile, jelly-like mass.

By providing a distance of about 2 or 3 feet between the water level and the tops of the partitions 14, the lumps of silica gel dropped into the tank will not be subjected to disintegration upon engaging the tops of the partitions and an even distribution of the material into all of the compartments provided between the several partitions will be effected. During the charging operation, it is desirable to maintain the water level below that of the conduit 12. This may be effected by withdrawing water through the conduit 10 through the false bottom at a rate equivalent to the rate of rise of the water in the tank caused by the introduction of the hydrogel therein. This procedure is desirable because the overflow of the water into the conduit 12 during charging will carry with it particles of hydrogel which results in a loss and a tendency to clog the conduit 12.

After the introduction of the gel into the tank 1 and the filling of all the compartments between the several partitions 14, the gel will reach a level about or above that of the tops of the partitions. Water at the proper temperature may then be introduced, for instance, through the conduit 10, caused to flow upwardly through the hydrogel and be discharged through the conduit 12. If desired, the direction of flow of the washing liquid may of course be downwardly through the hydrogel, in which instance the fresh wash water will be introduced through the conduit 12 and discharged through the conduit 10. The water may be passed intermittently or continuously through the hydrogel and, if desired, the water may be recirculated intermittently or continuously through the same tank or it may be conducted through a series of tanks and caused to flow either upwardly or downwardly through each of the tanks.

After the hydrogel has been subjected to the proper degree of washing, for example, about 48 hours, the water is drained out of the tank to allow the hydrogel to drain. The clusters of partitions 14 may then be removed by means of a crane, a hoist or other suitable means and the hydrogel removed from the tank by means of a grab bucket or other device. The washed gel may then be subjected to a drying treatment to convert it into a useful form. By re-inserting the clusters of partitions 14 in the tank and filling the tank with water, it is then ready to receive a further charge of hydrogel to be washed.

In some instances, it has been found that there is a tendency of the gel to adhere to the partitions if the liquid is drained from the gel before the partitions are removed. To obviate this, the partitions may be removed before drainage of the liquid, in which instance there is little or no adherence of the gel particles to the partitions.

It is also within the concept of the present invention to convert the hydrogel washed in the apparatus described into a plural gel such as an alumina silica gel. In this instance, a hydrogel to be treated is introduced into a tank filled with water in the manner hereinbefore described and after the hydrogel has been washed for about 48 hours the water is drained off. It is important in this instance that the partitions remain in place prior to the draining operation. Otherwise the hydrogel will sag. After the liquid has been drained from the hydrogel, a 20° Bé. solution of aluminum sulphate is introduced into the tank 1 and allowed to thoroughly contact the silica hydrogel therein. This solution may be introduced through the conduit 10 and may be continuously recirculated through the tank 1 by withdrawing it through the conduit 12 and reintroducing it into the conduit 9. After the required time, an equilibrium is established between the aluminum sulphate solution and the silica gel. It has been found that a period of about 4 hours is required for establishment of equilibrium. The aluminum sulphate solution after this length of time will be of reduced concentration, approximating 10° Bé.

After equilibrium is established, the solution is removed from the tank 1 and the gel contained therein allowed to drain for a period of up to 12 hours to insure that all of the aluminum sulphate solution is removed from the surface of the gel. Following draining of the solution from the gel, there is introduced rather quickly into the tank a solution containing about 5% ammonia. The ammonia acts to precipitate alumina from the aluminum sulphate which is held in the pores of the gel. It has been found preferable to introduce the ammonia solution into the bottom portion of the tank through the conduit 10 and allow it to gradually rise up through the tank. If the solution is not removed, there is a tendency to form a soft mass by the reaction of the ammonia with the aluminum sulphate solution. Actually, there are particles of the gel that have aluminum sulphate incorporated therein and there is a coagulation of the aluminum sulphate, resulting in the formation of alumina in the hydrogel. The ammonia solution which is introduced into the bottom is recirculated continuously in the tank in contact with the hydrogel therein until equalization has been effected. It has been found that with a 5% ammonia solution, a hydrogel containing the aluminum sulphate incorporated therein, as hereinbefore described, will have the alumina precipitated therein in about 4 hours, at which time the ammonia solution will be fully neutralized.

After the formation of the alumina in the hydrogel has been effected, the remaining ammonia solution is drained and the alumina silica gel is washed. Before draining the washed solution therefrom, the partitions are removed because otherwise the gel sags and there is a tendency for the gel to adhere to the partitions. The washed alumina silica gel may then be lifted out of the tank and conveyed to drying equipment.

An important feature of the present invention is the use of a narrow compartment in which a hydrogel is washed. A satisfactory width for a compartment which is about 10 feet in height has been found to be, for example, about 8 inches. The angle of repose of hydrogel is such that the total pressure on the bottom of the compartment is considerably reduced. Due to the relatively small downwardly exerted pressure on the gel at any given level in the compartment, there is little or no packing. Thus, substantially uniform spacing of gel particles is maintained during the washing and treating process, resulting in the production of a uniform product in large quantities.

From the foregoing description, it will be appreciated that the present invention provides for the support of a hydrogel during the washing and treatment thereof in large tanks by providing a plurality of partitions dividing the tank into small compartments, the hydrogel being supported principally by the partitions and side walls of the tank. After the partitions have served their purpose, they may be taken out to permit the use of a grab bucket to easily remove the so treated hydrogel.

The present invention also provides a satisfactory method of incorporating alumina in a silica hydrogel which insures the formation of an alumina silica gel of high alumina content. The present method of incorporating alumina in silica gel should not be confused with some of the prior methods which merely provide a surface coating of aluminum sulphate on a gel. In the present method, the aluminum sulphate is in the gel pores forming a part of the gel structure and by precipitating the alumina while so incorporated in the hydrogel, an alumina silica gel of high alumina content is obtained.

I claim:

1. An apparatus for treating hydrogels comprising an open top tank having a foraminous false bottom therein positioned above the bottom thereof, a plurality of removable vertical partitions dividing the space in the tank into a plurality of thin vertical free columns extending from said false bottom upwardly and open at the upper portion, means for mounting said removable partitions in said tank to enable removal thereof, and valved conduit means at the top of the tank and valved conduit means beneath the false bottom for the introduction and withdrawal of liquid.

2. An apparatus for the treatment of hydrogel comprising an open top tank, a foraminous false bottom in said tank spaced from the bottom of said tank, a plurality of clusters of vertically extending horizontally spaced parallel partitions removably mounted in said tank on said false bottom for dividing the space in said tank above said false bottom into a plurality of narrow continuous vertically extending compartments, spacers between the partitions of each cluster, means connecting the partitions of each cluster in assembled relation a liquid flow conduit communicating with the upper portion of said tank above said partitions, and a liquid flow conduit communicating with said tank beneath the false bottom, one of said conduits supplying wash liquid to the tank and the other conduit discharging liquid from the tank for producing a vertical flow of liquid through said compartments formed between said partitions.

3. An apparatus for the treatment of hydrogel comprising an open top tank, a foraminous false bottom in said tank spaced from the bottom of said tank, a plurality of clusters of vertically extending horizontally spaced parallel partitions removably mounted in said tank on said false bottom for dividing the space in said tank above said false bottom into a plurality of narrow continuous vertically extending compartments, spacers between the partitions of each cluster, means connecting the partitions of each cluster in assembled relation a liquid flow conduit communicating with the upper portion of said tank above said partitions, a liquid flow conduit communicating with said tank beneath the false bottom, one of said conduits supplying wash liquid to the tank and the other conduit discharging liquid from the tank for producing a vertical flow of liquid through said compartments formed between said partitions, and means for securing the partitions in position within the tank.

4. An apparatus for the treatment of hydrogel comprising an open top tank, a foraminous false bottom in said tank spaced from the bottom of said tank, a plurality of clusters of vertically extending horizontally spaced parallel partitions removably mounted in said tank on said false bottom for dividing the space in said tank above said false bottom into a plurality of narrow continuous vertically extending compartments, a liquid flow conduit communicating with the upper portion of said tank above said partitions, a liquid flow conduit communicating with said tank beneath the false bottom, one of said conduits supplying wash liquid to the tank and the other conduit discharging liquid from the tank for producing a vertical flow of liquid through said compartments formed between said partitions, means for fixedly securing said partitions together in parallel spaced relation, and handling means extending upwardly from certain of said partitions for cooperation with a hoist for inserting and removing the clusters in and from the tank.

5. An apparatus for the treatment of hydrogel comprising an open top tank, a foraminous false bottom in said tank spaced from the bottom of said tank, a plurality of clusters of vertically extending horizontally spaced parallel partitions removably mounted in said tank on said false bottom for dividing the space in said tank above said false bottom into a plurality of narrow continuous vertically extending compartments, a liquid flow conduit communicating with the upper portion of said tank above said partitions, a liquid flow conduit communicating with said tank beneath the false bottom, one of said conduits supplying wash liquid to the tank and the other conduit discharging liquid from the tank for producing a vertical flow of liquid through said compartments formed between said partitions, means for fixedly securing said partitions together in parallel spaced relation, handling means extending upwardly from certain of said partitions for cooperation with a hoist for inserting and removing the clusters in and from the tank, and means secured to the sides of the tank and engaging the handling means of the clusters for securing the clusters in position in the tank.

6. An apparatus for the treatment of hydrogel comprising an open top tank, a foraminous false bottom in said tank spaced from the bottom of said tank, a plurality of clusters of vertically extending horizontally spaced parallel partitions removably mounted in said tank on said false bottom for dividing the space in said tank above said false bottom into a plurality of narrow continuous vertically extending compartments, a liquid flow conduit communicating with the upper portion of said tank above said partitions, a liquid flow conduit communicating with said tank beneath the false bottom, one of said conduits supplying wash liquid to the tank and the other conduit discharging liquid from the tank for producing a vertical flow of liquid through said compartments formed between said partitions, reinforcing means at the vertical edges of the partitions and intermediate said vertical edges, bolts extending through the partitions and reinforcing means for securing the partitions together in assembled relation, means carried by the bolts for spacing the partitions apart, and means carried by certain of the intermediate reinforcing means for cooperation with a hoist for inserting the assembly in and removing it from the tank.

MARK SHOELD.

REFERENCES CITED

The following references are of record in the file of this patent:

UNITED STATES PATENTS

| Number | Name | Date |
|---|---|---|
| 2,093,454 | Kistler | Sept. 21, 1937 |
| 2,285,396 | Danforth | June 9, 1942 |
| 2,326,523 | Connolly | Aug. 10, 1943 |
| 905,473 | Smith et al. | Dec. 1, 1908 |
| 1,696,358 | Muller et al. | Dec. 25, 1928 |
| 68,010 | Steers | Aug. 20, 1867 |
| 2,229,353 | Thomas et al. | Jan. 21, 1941 |
| 1,555,837 | Dudley | Oct. 6, 1925 |
| 972,822 | Comey | Oct. 18, 1910 |
| 2,323,583 | Wilson | July 6, 1943 |
| 1,682,242 | Patrick | Aug. 28, 1928 |
| 863,168 | Griswold | Aug. 13, 1907 |